Sept. 17, 1946.    L. DEWAN    2,407,630
SUPERCHARGER
Filed Nov. 19, 1942
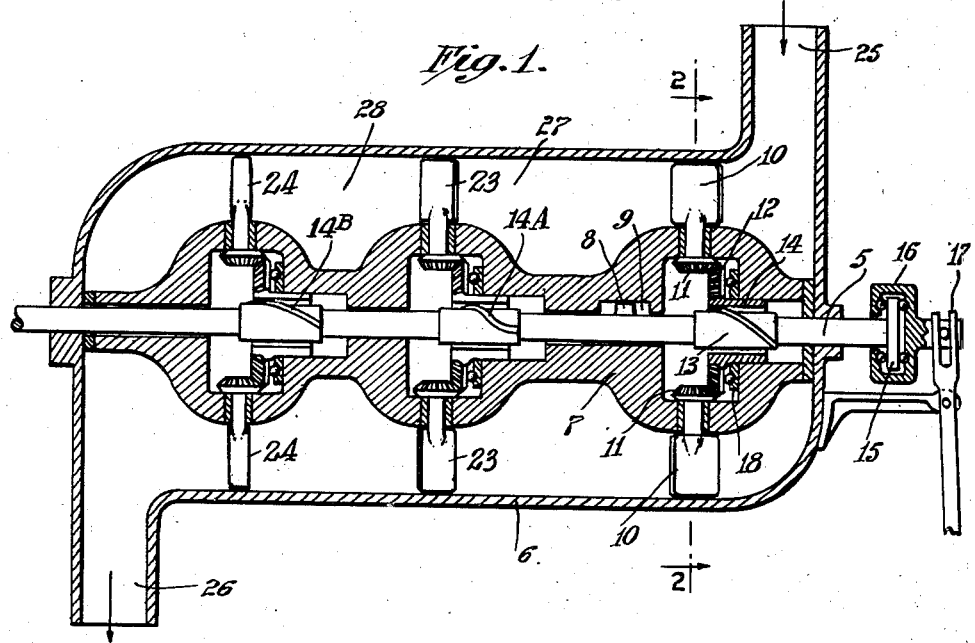
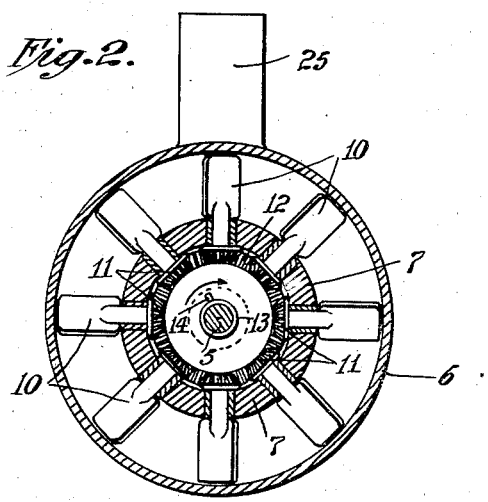
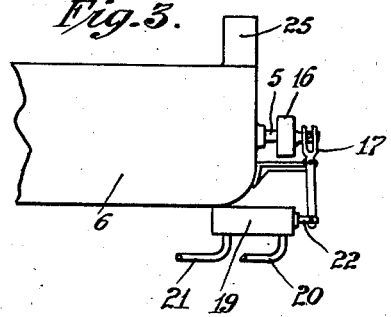
INVENTOR
*Leon Dewan*
BY
*Edw. S. Higgins*
ATTORNEY Patented Sept. 17, 1946

2,407,630

UNITED STATES PATENT OFFICE 2,407,630

SUPERCHARGER

Leon Dewan, Arverne, N. Y.

Application November 19, 1942, Serial No. 466,121

2 Claims. (Cl. 230—114)

This invention relates to superchargers and one object thereof is to enable the delivery of a large flow of air under pressure that will ensure engine efficiency at high altitudes.

Another object is to provide a controlling system in conjunction therewith that will regulate the flow and pressure of the delivered air in accordance with altitude without decreasing the efficiency of the apparatus or wasting engine power.

In accordance with the invention, a number of compressors are mounted in line on a drive shaft, the spaces therebetween forming a series of pressure chambers, the air in which is of increasingly high pressure as they are nearer the delivery point. The blades of the compressor facing the outside air has the highest pitch and the blades of the compressors behind have a successively decreasing pitch. The pitch of the first compressor is such as to work with maximum efficiency on the pressure of the outside air and each succeeding compressor blade pitch is designed for greatest efficiency for the pressure of the chamber it faces.

There is provided a variable pitch mechanism with each compressor, all these mechanisms having a common control which varies the pitch of all the compressors yet maintaining a constant pitch relation among them so that as the altitude of the plane varies the pressure is thus maintained constant at maximum efficiency.

Fig. 1 is a plan view of my improved supercharger, parts being broken away and parts being shown in section.

Fig. 2 is a cross sectional view thereof taken on the plane of the line 2—2 of Fig. 1.

Fig. 3 is a detail view.

In the drawing, the shaft 5 working in casing 6 is driven by the airplane engine (not shown) either directly or through suitable gearing. The shaft casing 7 is turned by the shaft 5 through the key 8 integral with the shaft 5 and sliding in keyway 9 in casing 7. The blades of the first compressor 10 are journalled in casing 7 and end in small bevel gears 11 which are engaged by the large beveled gear 12. A collar 13 fastened to the shaft 5 has a long pitch cam thread 14 which engages a thread in the hub of gear 12. The shaft 5 ends in a projection 15 which is engaged by the double thrust bearing cap 16. Moving the shaft 5 to and fro through cap 16 fork 17 will cause the cam thread 14 to turn gear 12 through an arc and thus turn gears 11 to vary the pitch of the blades. The force of the air tending to turn the blades themselves is so directed by the cam thread 14 as to force the gear 12 against the thrust bearing 18.

The shaft 5 may be moved to vary the pitch either manually or automatically. As illustrated in Fig. 3, the shaft may be moved by a well known type of hydraulic or Servo cylinder 19. Usually oil under pressure admitted into pipes 20 or 21 moves the piston 22 back and forth as desired. In this case, the oil may if desired be controlled by the same oil pressure means commonly used at present to vary the pitch of the airplane propeller itself.

The shaft 5 extending through the casing 7 is equipped with similar mechanism at compressors 23 and 24 to vary the pitch of their blades in a similar manner. However since blades 10 are of large pitch, blades 23 of medium pitch and blades 24 of small pitch, it is desirable that their pitches maintain constant relation throughout a change and therefore the pitch of their cam threads 14A and 14B corresponding to that of thread 14 is successively longer to create a pitch change that is successively less in each compressor according to its original pitch.

It will be seen by the arrows that air is drawn from the outside at 25 and forced into the engine inlet 26 at a substantially high pressure. The high pitch of blades 10 gives maximum efficiency for the pressure of the outside air which may be for example 8 pounds, while the lesser pitch of blades 23 gives maximum efficiency for the pressure in chamber 27, which may be 10 pounds, and the same goes for the pitch of blades 24 in relation to the pressure in chamber 28, which may be 12 pounds, the pressure behind blades 24 being 15 pounds. Thus the difference in pressure before and behind each compressor is not excessive and greater efficiency results. These values are of course only arbitrary and given for illustration purposes only, and the drawings represent the idea in a general way for illustration. There may be more blades on each compressor than shown and the pitch changing mechanism may be of any other suitable type.

The advantage of controlling the supercharger pressure in this variable pitch manner is that the losses occasioned in the use of cut-off valves and similar previous expedients is eliminated and no power is spent in uselessly running vanes. This feature can of course be applied even where only one compressor is employed in a supercharger to control the pressure.

I claim:

1. A supercharger for an aeroplane engine comprising a casing having an air inlet and an outlet member adapted to be connected to the engine air inlet, a series of air compressors in said casing, said compressors being spaced from each other to form air pressure chambers and each compressor having a plurality of radial blades, the blades of the compressor nearest the air inlet of the casing having the highest pitch and the blades of the compressors behind having a successively decreasing pitch, and mechanism including a control member and a blade turning means actuated thereby for adjusting the pitch of said blades, the action of said mechanism being such that the pitch adjustment of the compressor blades is greater for the blades of greater pitch.

2. An air compressor having a casing, a plurality of bladed impellers operating in series, said impellers being of unequal blade pitch, means including a control member and blade turning means actuated thereby for varying the blade pitch of said impellers, the blade pitch being varied unequally, the impeller of greater blade pitch being varied to a greater extent.

LEON DEWAN.